H. C. RASSMANN.
WATERING DEVICE FOR CATTLE.
APPLICATION FILED AUG. 27, 1920.
1,406,490.
Patented Feb. 14, 1922.
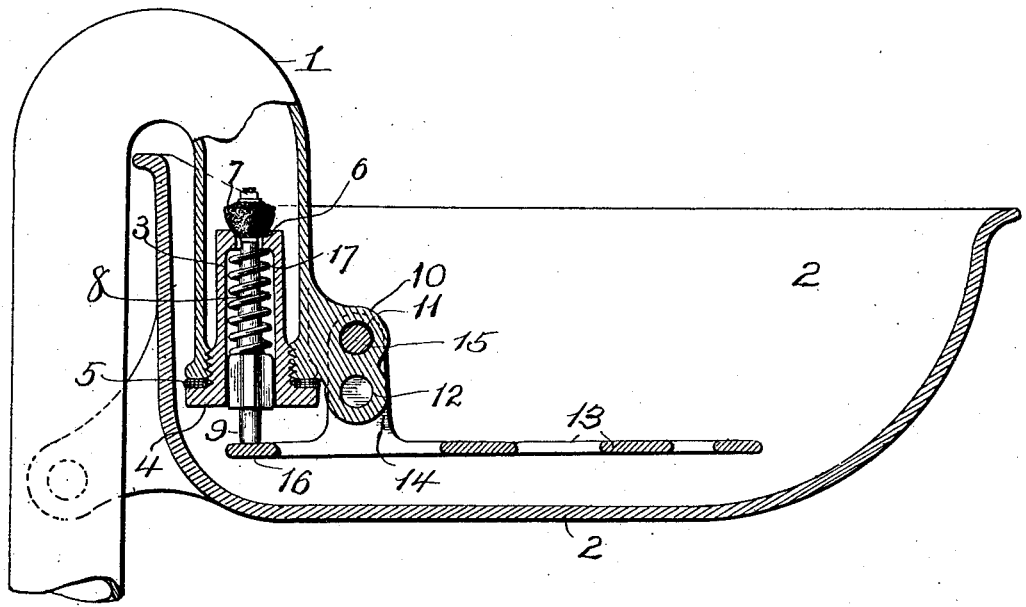

UNITED STATES PATENT OFFICE.

HUGO C. RASSMANN, OF BEAVER DAM, WISCONSIN, ASSIGNOR TO F. RASSMANN MANUFACTURING COMPANY, OF BEAVER DAM, WISCONSIN.

WATERING DEVICE FOR CATTLE.

1,406,490.	Specification of Letters Patent.	Patented Feb. 14, 1922.

Application filed August 27, 1920. Serial No. 406,342.

*To all whom it may concern:*

Be it known that I, HUGO C. RASSMANN, a citizen of the United States, and a resident of Beaver Dam, in the county of Dodge and State of Wisconsin, have invented certain new and useful Improvements in Watering Devices for Cattle; and I do hereby declare the following to be a full, clear, and exact description of the invention, such as will enable others skilled in the art to which it appertains to make and use the same.

This invention relates to improvements in watering devices for cattle.

In the use of watering devices in which the valve of the fount is controlled by the animal, it is sometimes desirable (as in the case of a sick animal for instance) to so adjust the device as to render the valve inoperable by the animal and therefore prevent water from flowing into the bowl when it is desired that the animal shall not drink. The object of my present invention is to provide simple and efficient means in a watering device for cattle to permit ready adjustment of the animal operated lever to either an operable or an inoperable position to permit the animal to control the supply of water to the bowl or to prevent the animal from causing water to flow into the bowl.

With this and other objects in view, the invention consists in certain novel features of construction and combinations of parts as hereinafter set forth and pointed out in the claims.

The accompanying drawing is a sectional view of a water device showing an embodiment of my invention.

1 represents a fount and 2 a drinking bowl,—which latter may be of any preferred construction and supported in any desired manner in position to receive water from the fount. The lower end of the fount may be threaded internally to receive the externally threaded portion of a tubular member 3 having a flange 4 at its lower end and between this flange and the lower end of the fount, a gasket 5 may be interposed. The upper end of the tubular member 3 is provided with a seat 6 for a valve 7 and the stem 8 of this valve extends downwardly through the tubular member 3 and is provided at its lower end with a projection 9 which extends below the plane of the lower end of the fount.

The fount 1 is provided near its lower end with a forwardly projecting arm or enlargement 10 having holes 11 and 12, one disposed above the other. An animal-operated lever 13 is located within the bowl and provided with upwardly projecting arms 14 which straddle the arm or enlargement 10 on the fount and are provided with holes for the accommodation of a pivot pin 15 which also passes through one of the holes in the arm or enlargement 10. The lever 13 extends beyond the upwardly projecting arms 14 and provides a member 16 to engage the projection 9 at the lower end of the valve stem and said lever and the valve are maintained in the normal position shown in the drawing by means of a valve spring 17 located in the tubular member 3.

When the parts are in the position shown in the drawing, with the pivot pin 15 passing through the upper hole 11 of the arm or enlargement 10, depression of the lever by the animal will cause the opening of the valve to permit water to flow into the bowl. When it is desired to so adjust the device as to prevent the opening of the valve by the animal, the attendant will remove the pivot pin 15 from the hole 11 and insert it through the lower hole 12 in the arm or enlargement 10 so as to connect the upper portion of the lever arm 14 with said arm or enlargement 10 near the lower portion of the latter and thus render the lever 13 inoperable by the animal to open the valve.

It is evident that instead of providing the arm or enlargement with two superimposed holes, said arm or enlargement may be provided with one hole and the upwardly projecting arms 14 each be provided with superimposed holes.

Having fully described my invention what I claim as new and desire to secure by Letters-Patent, is:

1. In a watering device, the combination of a valved fount, a bowl, an animal-operated lever in the bowl for opening the valve of the valved fount, and separated bearings on the fount for said animal-operated lever, whereby the latter may be mounted on the fount in either operable or inoperable relation to the valve.

2. In a watering device, the combination with a bowl, of a valved fount and a valve-operating lever, one of said parts having a plurality of holes disposed one above another and the other part having a single hole, and a pivot pin mountable in one or another of said plurality of holes and passing through the hole in the other part to connect said lever and fount with the lever in either operable or inoperable position.

3. In a watering device, the combination with a bowl, of a valved fount entering the same and provided with an arm having a plurality of holes one above another, an animal-operated lever having an upwardly projecting arm, and a pivot pin adaptable to any of said plurality of holes to adjustably connect the upwardly projecting arm of the lever with the fount, said lever having a part cooperable with the valve of the valved fount.

In testimony whereof, I have signed this specification in the presence of two subscribing witnesses.

HUGO C. RASSMANN.

Witnesses:
 VIVA MOORE,
 GLADYS M. CRAMER.